(12) United States Patent
Chun

(10) Patent No.: US 12,544,134 B2
(45) Date of Patent: Feb. 10, 2026

(54) METHOD FOR TREATING ACNE USING LASER

(71) Applicant: LUTRONIC CORPORATION, Goyang-si (KR)

(72) Inventor: Soo Il Chun, Seoul (KR)

(73) Assignee: LUTRONIC CORPORATION, Goyang-si (KR)

( * ) Notice: Subject to any disclaimer, the term of this patent is extended or adjusted under 35 U.S.C. 154(b) by 287 days.

(21) Appl. No.: 18/457,700

(22) Filed: Aug. 29, 2023

(65) Prior Publication Data

US 2025/0000577 A1   Jan. 2, 2025

(30) Foreign Application Priority Data

Jun. 29, 2023 (KR) ........................ 10-2023-0084290

(51) Int. Cl.
*A61B 18/20* (2006.01)
*A61B 18/00* (2006.01)

(52) U.S. Cl.
CPC .... *A61B 18/203* (2013.01); *A61B 2018/0047* (2013.01); *A61B 2018/00476* (2013.01); *A61B 2018/00571* (2013.01); *A61B 2018/00702* (2013.01)

(58) Field of Classification Search
None
See application file for complete search history.

(56) References Cited

U.S. PATENT DOCUMENTS

| | | | |
|---|---|---|---|
| 2003/0004501 A1* | 1/2003 | Wilkens | A61N 5/0616 607/91 |
| 2004/0034341 A1 | 2/2004 | Altshuler et al. | |
| 2005/0049582 A1* | 3/2005 | DeBenedictis | A61B 18/20 606/9 |
| 2005/0107852 A1* | 5/2005 | Levernier | A61B 18/203 607/89 |
| 2006/0004347 A1 | 1/2006 | Altshuler et al. | |
| 2006/0128771 A1 | 6/2006 | Mirkov et al. | |
| 2008/0091179 A1 | 4/2008 | Durkin et al. | |
| 2010/0056982 A1* | 3/2010 | Curaudeau | A61K 41/0071 604/20 |
| 2010/0204686 A1* | 8/2010 | Yaroslavksy | A61N 5/062 606/9 |
| 2012/0059307 A1* | 3/2012 | Harris | A61P 1/04 977/773 |
| 2013/0096546 A1 | 4/2013 | Mirkov et al. | |
| 2016/0192988 A1 | 7/2016 | Albright | |
| 2018/0236260 A1 | 8/2018 | Tagliaferri et al. | |
| 2020/0261580 A1* | 8/2020 | Willey | A61K 9/06 |

FOREIGN PATENT DOCUMENTS

KR   10-2005917 B1   7/2019

OTHER PUBLICATIONS

The Extended European Search Report for European Patent Application No. 24184737.5, dated Nov. 13, 2024.

* cited by examiner

*Primary Examiner* — Michael T. Holtzclaw

(57) ABSTRACT

Disclosed is a method for treating acne using a laser, and the method includes: positioning a handpiece on a skin surface where the acne is located; and irradiating a therapeutic light through the handpiece to denature some tissues beneath the acne.

17 Claims, 9 Drawing Sheets

(a)          (b)

(a)             (b)

METHOD FOR TREATING ACNE USING LASER

CROSS-REFERENCE TO RELATED APPLICATIONS

This application claims the benefit of Korean Patent Application No. 10-2023-0084290, filed on Jun. 29, 2023, the contents of which are all hereby incorporated by reference herein in their entirety.

TECHNICAL FIELD

The present disclosure relates to a method for treating acne using a laser, and more particularly, to a method for treating acne by irradiating a therapeutic laser light to a skin surface where the acne is located to denature tissues beneath the skin surface.

BACKGROUND

Acne is one of the common skin diseases. Acne is an inflammatory skin disease that occurs on a pathway where lipid substances are excreted from a sebaceous gland in a hair follicle. It usually occurs in adolescence but may persist into adulthood, exhibiting characteristics of a chronic condition.

The treatment of acne involves various approaches, such as manually extracting a comedone formed in a skin surface, prescribing medications to reduce the activity of the sebaceous gland, or irradiating a laser to eliminate inflammatory bacteria associated with acne. However, these conventional treatment methods temporarily improve symptoms, but an acne lesion may continuously reoccur in a short cycle.

SUMMARY

An aspect of the present disclosure provides a method for treating acne, the method in which a recurrence cycle of acne is delayed by treating an acne lesion fundamentally in consideration of underlying mechanisms of acne formation.

In addition, another aspect of the present disclosure provides a method for treating acne, in which aesthetic improvement of surrounding skin tissues is achieved in addition to the treatment of the acne.

In an aspect, there is provided a method for treating acne using a laser, the method including: positioning a laser handpiece on a skin surface where the acne is located; and irradiating a therapeutic light through the handpiece to denature some tissues beneath the acne.

Here, in the irradiating of the therapeutic light, the therapeutic light may be irradiated so that at least a part of infundibulum beneath the acne is necrotized.

Specifically, the therapeutic light may be irradiated so that energy is delivered to a duct opening of a sebaceous gland beneath the acne. In addition, a depth to which the therapeutic light penetrates may range from 200 μm to 500 μm from the skin surface.

In this embodiment, the therapeutic light may have a wavelength having a water absorption of 100 $cm^{-1}$ or more. For example, a laser having a wavelength of 1800 nm to 2000 nm may be used as the therapeutic light.

In addition, the therapeutic light may have a spot size of 150 μm to 500 μm and be irradiated with an output power of 5 W to 30 W. More specifically, the therapeutic light may have a spot size of 300 μm to 400 μm and be irradiated with an output power of 10 W to 25 W.

Meanwhile, the irradiating of the therapeutic light may include: a first therapeutic light irradiating operation of irradiating a therapeutic light to an entire skin surface where the acne is located; and a second therapeutic light irradiating operation of selectively and additionally irradiating a therapeutic light to a partial area where relatively severe acne is located.

Here, in the second therapeutic light irradiating operation, the therapeutic light may be irradiated to deliver more energy per unit area, compared to the first therapeutic light irradiating operation.

Specifically, in the second therapeutic light irradiating operation, the therapeutic light may be irradiated at a higher irradiation density, compared to the first therapeutic light irradiating operation. Or, in the second therapeutic light irradiating operation, the therapeutic light may be irradiated with a larger spot size, compared to the first therapeutic light irradiating operation. Or, in the second therapeutic light irradiating operation, the therapeutic light may be irradiated with a greater output power, compared to the first therapeutic light irradiating operation.

In another aspect, there may be provided a method for treating acne, in which a therapeutic light is irradiated to a skin surface where the acne is located to induce necrosis of an infundibulum beneath the acne.

Here, the therapeutic light may penetrate from the skin surface to a depth of 200 to 500 μm to induce tissue necrosis. In addition, a laser having a wavelength of 1800 nm to 2000 nm may be used as the therapeutic light.

Furthermore, the method may further include: after an elapse of a recovery time for remodeling the necrotic infundibulum, irradiating the therapeutic light to the remodeled infundibulum to induce re-necrosis of the infundibulum.

According to the present disclosure, it is possible to perform comprehensive treatment for various types of acne, and to minimize the recurrence of acne by facilitating remodeling of a damaged infundibulum.

In addition, a therapeutic light of a wavelength having an excellent water absorption is used, so when the therapeutic light is irradiated to normal skin tissues around acne, energy may be delivered to the inside of the skin tissues without damaging the skin surface, thereby achieving aesthetic improvement.

DETAILED DESCRIPTION

Figure 1:
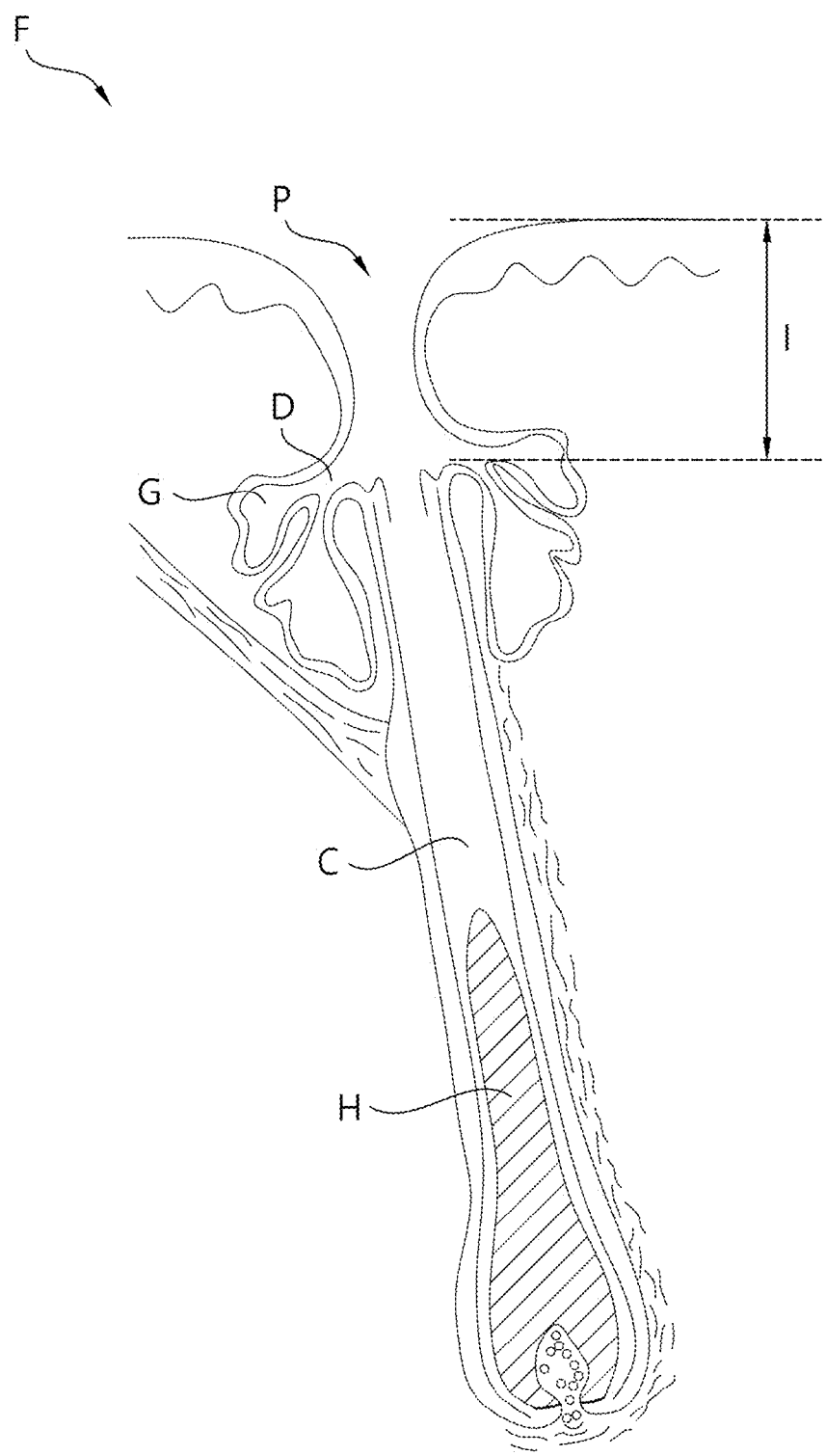
FIG. 1 is a cross-sectional view showing the structure of a sebaceous follicle.

Hereinafter, a method for treating acne using a laser treatment device according to an embodiment of the present disclosure will be described in detail with reference to the drawings. In the following description, the positional relationship of each component is principally described based on the drawings. The structure of the present disclosure in the drawings may be illustrated, for the convenience of description, as simplified or exaggerated if necessary. Therefore, the present disclosure is not limited to the drawings, and may be implemented by adding, changing, or omitting various devices or processes.

FIG. 1 is a cross-sectional view showing the structure of a sebaceous follicle.

Hair follicles formed in the skin may be classified into beard follicles, vellus follicles, and sebaceous follicles. A beard follicle may produce a coarse and long terminal hair. In addition, a vellus follicle may have a relatively small pore and a fine hair inside, and a disproportionately large sebaceous gland is formed inside the vellus follicle. However, acne to be treated in the present disclosure does not frequently occur in the aforementioned beard and vellus follicles, but frequently occurs in a sebaceous follicle which will be described later.

A sebaceous follicle F may form a relatively large pore P in a skin surface, and the pore P may be visible with bare eyes, especially in oily skin. The sebaceous follicle F may form a long canal C inside the skin, and such a canal C may be generally formed at a depth of 2.5 mm or more. A pilary portion H may be located beneath the canal, and this pilary portion H may be too small to be visible with bare eyes. At least one sebaceous gland G may be formed on at least one side of the canal C. This sebaceous gland G may be formed in a larger size than sebaceous glands formed in other types of hair follicles and may have a multilobular structure. The sebaceous gland G may be connected to the canal C through the duct D. Sebum produced in the sebaceous gland G may fill the canal C through a duct opening. A part of the canal C connected to the duct opening of the sebaceous gland G from a lower side of the pore P may be referred to as an infundibulum I, and the sebum filled in the canal C may go along the infundibulum I to the skin surface and be discharged through the pore P.

Figure 2:
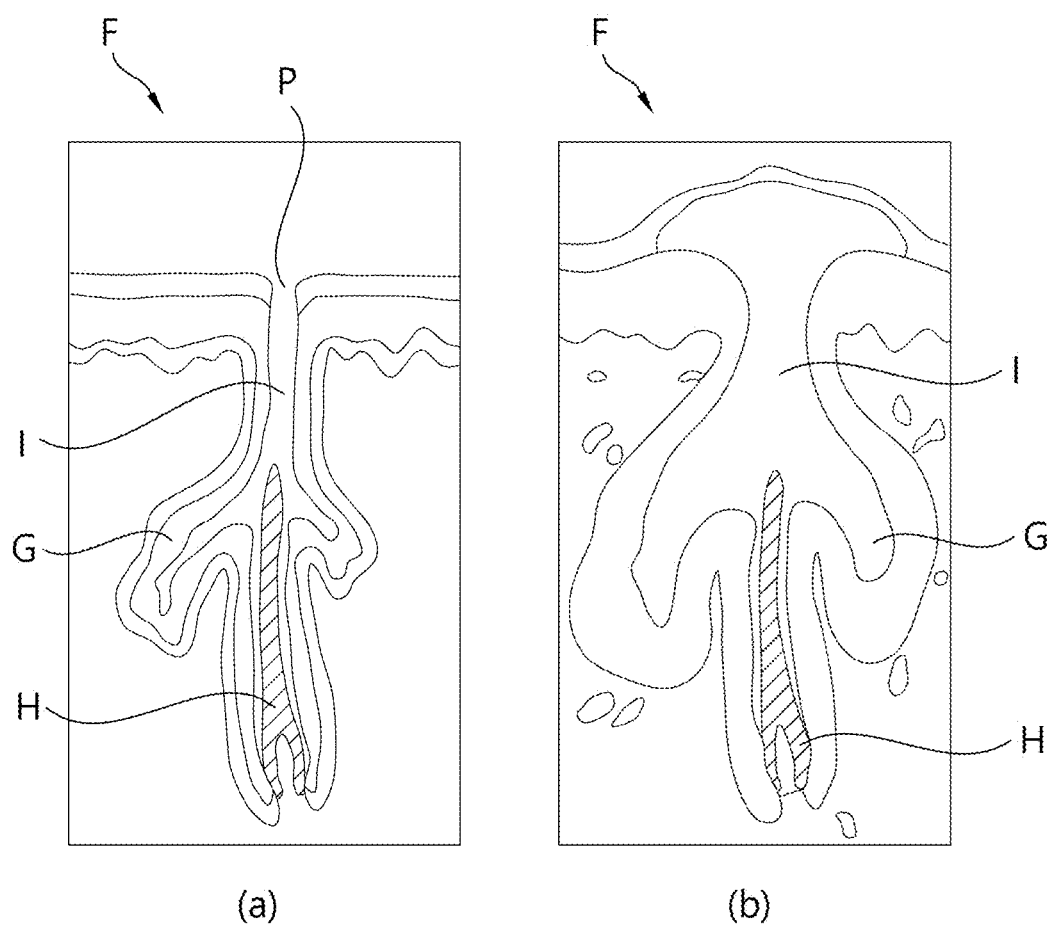
FIG. 2 shows the appearance of a normal sebaceous follicle and a sebaceous follicle with acne.

FIG. 2 is a view showing a normal sebaceous follicle a and a sebaceous follicle b with acne formed therein. When the sebaceous gland G of the sebaceous follicle F becomes active due to hormonal changes or the like, the sebaceous gland G may produce a large amount of sebum and secrete the sebum to the skin surface, which causes the skin surface to become oily. In this case, when the pathway through which the sebum is secreted is blocked due to various causes, the sebum cannot be properly secreted, resulting in the formation of acne.

To explain this process in detail, the pore P of the sebaceous follicle may be closed due to an abnormality of the stratum corneum forming the skin surface (Stage 1). This may be attributed to various causes, including genetic defects such as dyskeratosis. When the sebum secretion pathway is blocked, a white comedone may be formed at a location of the pore.

In this state, if sebum is continuously produced in the sebaceous gland G, the sebum may be continuously accumulated on the closed sebum secretion pathway and the secretion pathway may be enlarged. Therefore, as enlargement of the infundibulum I forming the secretion pathway may lead to deformation of a wall structure of the infundibulum I and occurrence of abnormalities, and the blocked sebaceous follicle may also be enlarged towards the skin surface, like a balloon, and form either a whitehead or blackhead (Stage 2).

Thereafter, when the expanded skin surface or sebum secretion pathway are infected due to bacterial invasion, this may result in inflammatory lesions. As a result, the enlarged acne may become red in color, and papules and pustules may develop (Stage 3).

Then, when the enlarged sebaceous secretion pathway ruptures, the inflammatory lesion may spread out widely to the surrounding tissues, resulting in the formation of comedones, nodules, and cysts, and this may eventually lead to a scar (Stage 4).

Conventional treatment methods for an acne lesion may, depending on a stage of progression of acne, include: treatment or prescription for drainage (Stage 1): prescription for suppressing the activity of the sebaceous gland (Stage 2): prescription of antibiotics to treat inflammation (Stages 3 and 4); and an appropriate combination thereof. However, although these treatment methods may temporarily improve symptoms of a lesion, but there are limitations in terms of frequent recurrence of the lesion. In addition, conventionally, different treatments are required according to a stage of progression of acne. However, since most patients have acne of various stages, applying a complex treatment may be burdensome to both an operator and a patient.

Figure 3:
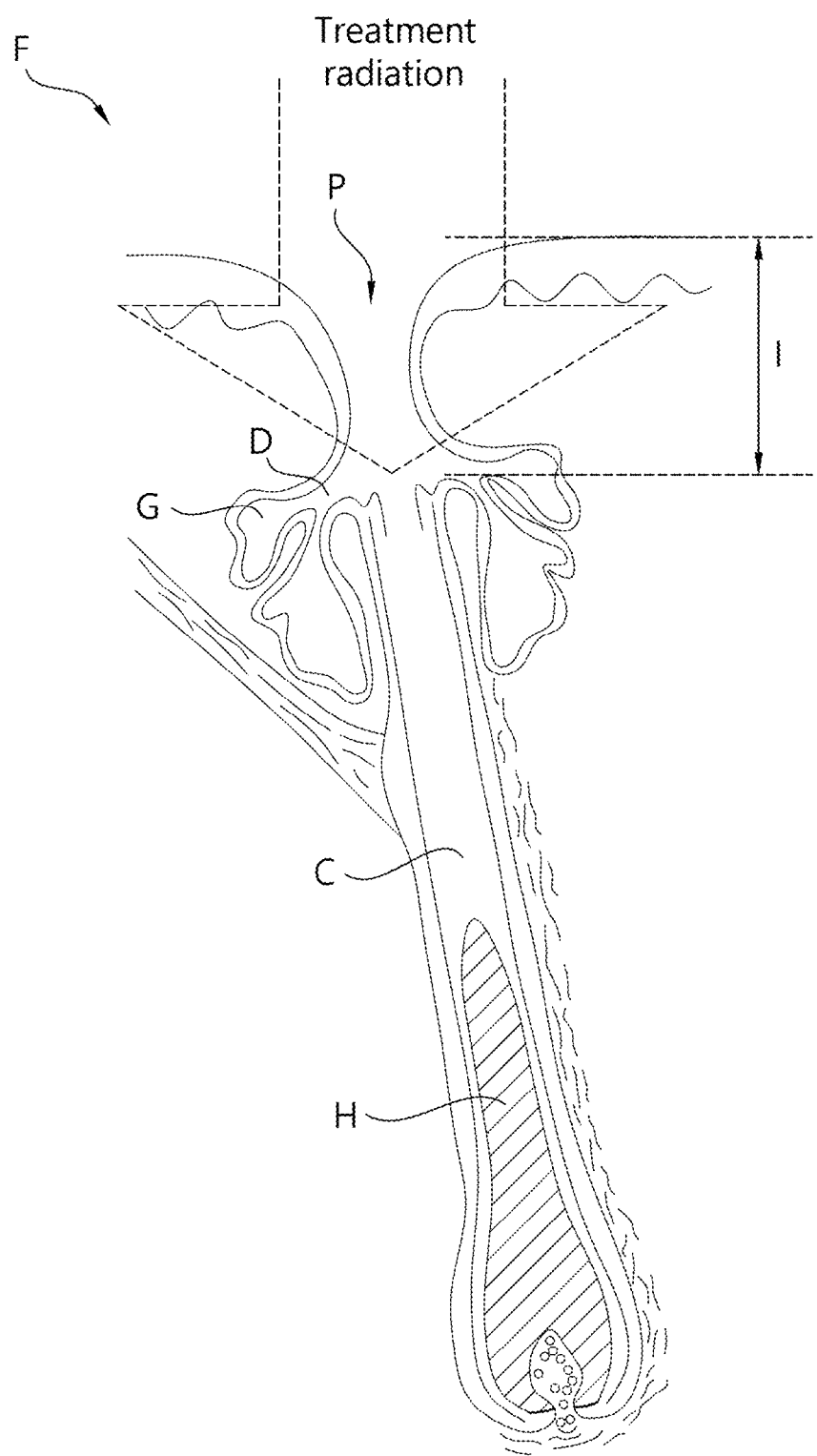
FIG. 3 is a cross-sectional view showing a state in which a therapeutic light is irradiated to a location of an acne lesion.

The present disclosure provides a method for treating acne in an optical manner to solve the problems of the conventional treatment methods. FIG. 3 is a cross-sectional view illustrating a state in which a therapeutic light is irradiated to a location of an acne lesion. Hereinafter, a method for treating acne using a laser according to an embodiment of the present disclosure will be described in detail with reference to FIG. 3.

In the treatment method according to the present disclosure, acne may be treated in a manner in which a therapeutic light is absorbed by underlying tissues of a skin surface where the acne is located to denature at least some tissues of a sebaceous follicle. While there have been existing methods for treating acne using lasers, they differ from the treatment method described below in that the existing acne treatment methods involve using a lasers to kill inflammatory bacteria or remove sebum.

As shown in FIG. 3, the therapeutic light may be irradiated onto the skin surface and reach the underlying tissues at the location where acne is formed. The therapeutic light may denature some tissues of the sebaceous follicle where an acne lesion has occurred. Specifically, the therapeutic light may cause necrosis of the infundibulum I of the sebaceous follicle F. As described above, the infundibulum I may be the upper structure of the canal C of the sebaceous follicle, and may indicate a section between the sebaceous gland G and the opening of the duct D from the lower side of the hair follicle. The infundibulum I may correspond to a sebaceous gland secretion pathway of the sebaceous follicle. As the acne lesion progresses, the infundibulum I may be abnormally enlarged, thereby causing deformation and damage to the wall structure of the infundibulum I. Such deformation and damage of the infundibulum I may worsen the skin condition and cause rapid recurrence of the acne lesion even if the acne lesion is treated in accordance with the conventional treatment methods. However, based on experimental results, it is observed that in a case where the infundibulum of the sebaceous follicle is necrotic by light irradiation, if the sebaceous gland is not necrotic, the infundibulum structure is remodeled from the epidermis within a period of approximately 2 to 4 weeks, leading to the restoration of the damaged sebaceous follicle structure to a normal structure. Accordingly, in the present disclosure, treatment may be conducted in such a way that a therapeutic light is irradiated to deliver energy to the infundibulum so as to induce necrosis so that the deformed or damaged infundibulum structure can be remodeled into a normal structure.

This treatment method has the advantage of comprehensively treating acne lesions with various stages of progression. Specifically, for an acne lesion in Stage 1 of progression, a drainage pathway may be formed as the therapeutic light partially removes the surface of a comedone. In addition, the method may also necrotize the sebum secretion pathway, preventing the acne lesion from worsening. Likewise, for an acne lesion in Stage 2 of progress, the sebum secretion pathway may be necrotized to prevent an increase in sebum secretion, and furthermore, the therapeutic light may reduce the activity of a sebaceous gland to reduce an amount of sebum production. In addition, for acne in Stage 3 and Stage 4 of progress, at a time of irradiating a therapeutic light, the temperature of the sebaceous follicle and the tissues adjacent to the sebum follicle may increase to thereby kill bacteria causing inflammation and remove inflammatory tissues.

In addition, this treatment method not only improves the current symptom caused by an acne lesion, but also restores the structure of sebaceous follicle damaged by the acne lesion to a normal sebaceous follicle structure over a recovery time of about 2 to 4 weeks. As such, this treatment method has the advantage of semi-permanently treating an acne lesion at a corresponding location or significantly delaying a recurrence cycle of the acne lesion by fundamentally treating a structural damage caused by the acne lesion.

In order to treat acne according to the method described above, a therapeutic light may penetrate the skin surface to a predetermined depth and be absorbed into tissues. In order to restore the infundibulum I destructed or damaged by an acne lesion into a normal structure, it is necessary to necrotize the entire structure of the infundibulum I or to necrotize more than 70% of the upper portion of the infundibulum I, where the destruction or damage to the wall structure of the infundibulum I is concentrated. For the sebaceous follicle F, since the infundibulum I is formed deeper inside the skin compared to other types of hair follicles a therapeutic light may penetrate to a corresponding depth. Generally, the infundibulum of a sebaceous follicle may be at a depth of about 300 µm to 500 µm from the skin surface. Accordingly, the therapeutic light may penetrate from the skin surface to a depth of about 200 µm to about 500 µm. Hereinafter, specific parameters of the therapeutic light for this purpose will be described.

Figure 4:
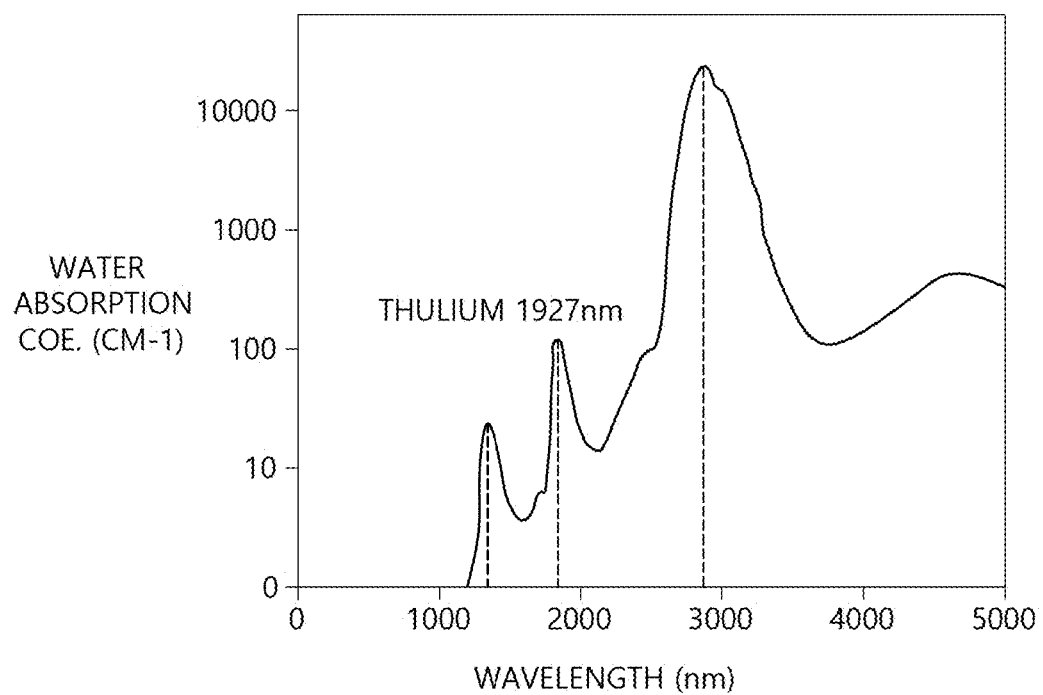
FIG. 4 is a graph showing water absorption by wavelength of therapeutic light.

FIG. 4 is a graph showing water absorption by wavelength of therapeutic light. For a therapeutic light according to the treatment method of the present embodiment, it is preferable to use a light having a wavelength with a high water absorption so as to deliver energy to a location deep in the skin. Considering that the infundibulum I corresponds to a sebum secretion pathway, it may be considered to use a wavelength with high lipid absorption. In this case, however, it is observed that only lipids are selectively dissolved while wall tissues such as infundibulum I are not sufficiently necrotic, and that the sebaceous gland G producing sebum is destroyed, resulting in impaired remodeling of the infundibulum I. On the other hand, when a light having a wavelength with a high water absorption is used, energy may be absorbed by the infundibulum I and adjacent tissues, so that the infundibulum I forming a relatively thin canal structure is selectively necrotized. In addition, the sebaceous gland G having a multi-lobed structure may not be destroyed and a damage may occur only to an extent that the sebum production activity is lowered, and thus, the normal infundibulum I structure can be remodeled over a recovery time.

Additionally, when a therapeutic light for acne treatment is irradiated, the therapeutic light may be irradiated not only to a location of an acne lesion but also to adjacent locations. In this case, when a light having a wavelength with a high water absorption is used, the light may be absorbed into the surrounding skin tissues to deliver energy, thereby achieving aesthetic effects such as wrinkle improvement in the tissues. In particular, light having a wavelength with a high water absorption may be hardly absorbed in the stratum corneum forming the skin surface, but absorbed into the underlying skin tissues. Therefore, since treatment and recovery proceed while the stratum corneum is maintained without damaging the skin surface, it is possible to resume daily activities and experience a quick recovery after the treatment. As such, when a wavelength with a high water absorption is used, there is an advantage in that aesthetic improvement of adjacent skin can be achieved along with treatment of an acne lesion.

Specifically, the therapeutic light of the present embodiment uses a light with a water absorption of 10 $cm^{-1}$ or more. For example, a light having a wavelength of 1800 nm to 2000 nm may be used as the therapeutic light. Since the therapeutic light having a wavelength of 1800 nm to 2000 nm has a much higher water absorption (more than 100 $cm^{-1}$) compared to lipid absorption (a difference of more than 10 times based on absorption coefficient), it is not possible to induce necrosis of the infundibulum without destroying the sebaceous gland of the sebaceous follicle. For example, a thulium laser having a wavelength of 1927 nm may be used as the therapeutic light. In addition, it is also possible to use light having various wavelengths satisfying the above-described absorption characteristics.

In the case of using a light having a wavelength of 10 $cm^{-1}$ in water absorption, the therapeutic light may have a spot size of 150 µm to 500 µm, and more specifically, a spot size of 300 µm to 400 µm. In addition, a therapeutic light may be irradiated with an output power of 5 W to 30 W. More specifically, a therapeutic light may be irradiated with an output power of 10 W to 25 W. When a therapeutic light satisfies the aforementioned parameters, it is possible to penetrate deep below the infundibulum of the sebaceous follicle and deliver energy sufficient to induce necrosis and remodeling of the infundibulum.

Figure 5:
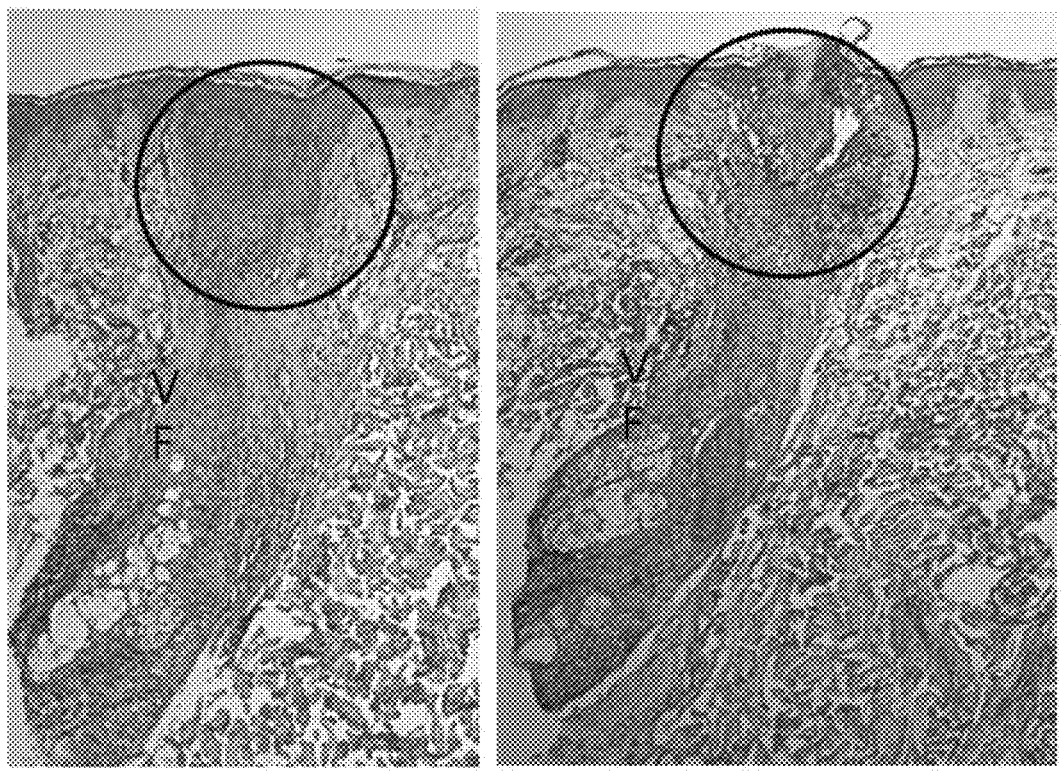
FIG. 5 is an image of a cross section of a sebaceous follicle irradiated with a therapeutic light according to a treatment method of the present disclosure.

FIG. 5 is an image of a cross section of a sebaceous follicle irradiated with a therapeutic light according to a treatment method according to the present disclosure. Specifically, for a patient with acne in progress, a therapeutic light having a wavelength of 1927 nm may be used on the skin tissue. The mode may be selected to have a spot size of 350 µm and an energy of 20 mJ, and the therapeutic light may be irradiated at a density of 225 beams/$cm^2$. According to a result of imaging a cross-section of the patient's skin tissue immediately after irradiation with the therapeutic light, it is observed that the structure of the infundibulum I of a sebaceous follicle is selectively necrotized (see (a) in FIG. 5A). According to a result of imaging a cross-section of the skin tissues one week after the irradiation of the therapeutic light, it is observed that the structure of the infundibulum is remodeled, starting from the upper side corresponding to the skin surface. As such, in the treatment method according to the present disclosure, by selectively necrotized and remodeling the infundibulum, it is possible not only to treat an acne lesion but also to restore systemic defects caused by the acne lesion, thereby fundamentally treating the acne.

Hereinafter, an example of performing the above-described treatment method using a laser treatment device will be described in detail.

Figure 6:
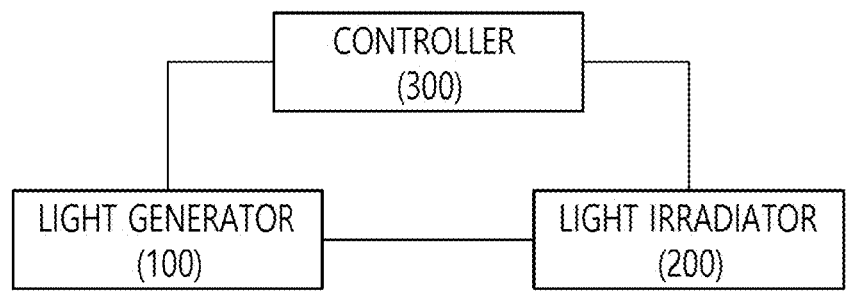
FIG. 6 is a block diagram showing the main configuration of a laser treatment device for performing a treatment method according to an embodiment of the present disclosure.

FIG. 6 is a block diagram showing the main configuration of a laser treatment device for performing a treatment method according to an embodiment of the present disclosure. As shown in FIG. 6, the laser treatment device may include a light generator 100, a light irradiator 200, and a controller 300. However, since the basic configuration of a laser treatment device for skin lesion treatment is well known, a description of the specific configuration will be omitted, and the main features according to this embodiment will be mainly described.

The light generator 100 may generate a laser light as a therapeutic light, and the therapeutic light may have a wavelength of 1800 nm to 2000 nm. For example, the light generator may be configured to generate a laser having a wavelength of 1927 nm using a thulium medium.

The light irradiator 200 may be a component that irradiates a therapeutic light generated by the light generator 100 to a treatment position on the skin surface. The light irradiator 200 may be implemented in various ways. For example, the light irradiator 200 may be implemented as a handpiece capable of moving a light irradiating position while held by an operator. The light irradiator 200 may be connected to the light generator 100 by a connecting part (not shown). The connecting part may form a path along which light travels by using an optical fiber or a reflective member, and a therapeutic light generated by the light generator 100 may be transmitted to the light irradiator 200 through the connecting part.

The controller 300 may be a component that controls the light generator 100 and the light irradiator 200 based on a treatment mode or the like set by a user. Accordingly, the controller 300 may be configured to control various parameters of a therapeutic light, such as an output power, an irradiation pattern, a spot size, and the like according to settings. However, since a specific configuration for adjusting the therapeutic light parameters is well known, a detailed description thereof will be omitted.

Such a treatment device may provide various treatment modes according to a treatment target area, a stage of progress of an acne lesion, and the like, and the controller may control various components according to a set treatment mode. For example, the treatment mode may include a first treatment mode and a second treatment mode. In the first treatment mode, a therapeutic light may be generated so that the skin surface where acne is located is extensively irradiated to proceed with treatment. In the second treatment mode, a therapeutic light may be generated to selectively treat some regions with relatively severe acne lesions (e.g. Stage 3 and Stage 4). Therefore, compared to the first treatment mode, the second treatment mode may be configured to irradiate a therapeutic light with a relatively high output power so as to deliver stronger energy to the skin surface. In addition, during treatment in the first treatment mode, the user may irradiate a therapeutic light while moving the light irradiator so that the therapeutic light can be widely irradiated to the skin surface. Also, during treatment in the second treatment mode, the user may irradiate a therapeutic light while fixing the light irradiator at a selected position so that the therapeutic light can be selectively irradiated to a partial area. Considering the user's operation, the second treatment mode may be configured to irradiate a therapeutic light having a relatively large spot size at a high irradiation density (the number of therapeutic lights emitted per unit area), compared to the first treatment mode. However, aspects of the present disclosure are not limited thereto, and various changes may be made.

A method for treating acne according to the present embodiment may be performed using the above-described laser treatment device. Hereinafter, a specific treatment method will be described using FIGS. 7 to 9.

Figure 7:
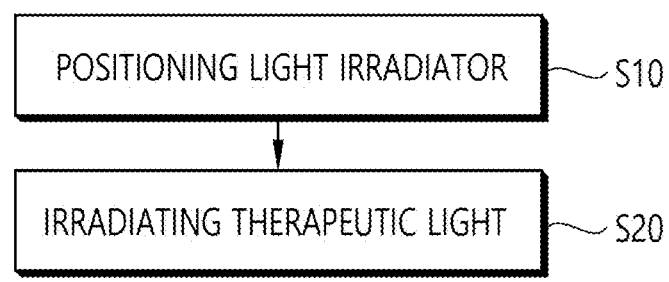
FIG. 7 is a flowchart illustrating a treatment method according to an embodiment of the present disclosure.

FIG. 7 is a flowchart illustrating a treatment method according to an embodiment of the present disclosure. As shown in FIG. 7, the treatment method may include positioning a light irradiator at a treatment position in operation S10 and irradiating a therapeutic light in operation S20.

While monitoring the skin condition of a patient, an operator may classify and determine a location of occurrence of an acne lesion and a stage of progress of acne (severity of acne) by location. Then, after establishing a treatment plan corresponding to the patient's skin condition, the operator may position the light irradiator on the skin surface where an acne lesion corresponding to the treatment target area is located in operation S10.

Thereafter, a therapeutic light may be irradiated in operation S20. As described above, the therapeutic light has a wavelength ranging from 1800 nm to 2000 nm, and when the above-described laser treatment device is used, the therapeutic light has a wavelength of 1927 nm. Here, the controller 300 controls the light generator 100 and/or the light irradiator 200, so that the therapeutic light has a spot size of 150 µm to 500 µm and is irradiated with an output power of 5 W to 30 W.

Figure 8:
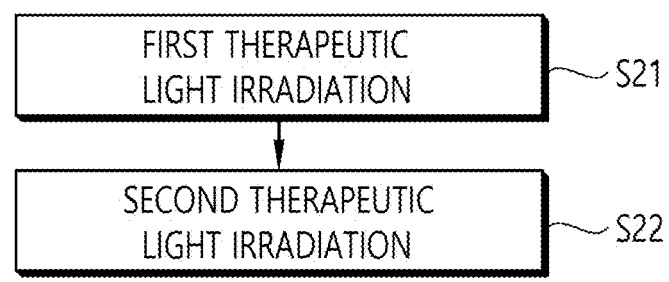
FIG. 8 is a flowchart specifically illustrating a therapeutic light irradiating operation of FIG. 7.

FIG. 8 is a flowchart illustrating a therapeutic light irradiating operation of FIG. 7 in detail. The above-described therapeutic light irradiating operation may be performed as a single operation, but may be performed by dividing a treatment target area based on a severity of acne lesion. When acne lesions have progressed to Stages 3 and 4, the infundibulum may be relatively greatly enlarged, resulting in severe deformation and advanced inflammation. Thus, delivering higher energy to a treatment target area is more effective in treatment, compared to a case where acne lesions are in Stages 1 and 2. Therefore, the therapeutic light irradiating operation S20 of the present embodiment may include: a first therapeutic light operation S21 of irradiating a therapeutic light to the entire area where the acne lesions are located; and a second therapeutic light irradiating operation S22 of additionally irradiating a therapeutic light to some regions of interest where the acne lesions have progressed to a severe level.

The first therapeutic light irradiating operation S21 may be an operation of irradiating a therapeutic light to the entire area set as a treatment target area by the operator prior to treatment. For example, in this operation, the treatment may be performed by irradiating a therapeutic light in the first treatment mode described above. Therefore, in the region where the therapeutic light is irradiated in this operation, acne corresponding to Stages 1 to 4 may all be located. In this operation, the controller 300 may control the therapeutic light to have a spot size of about 150 µm to 250 µm and to be irradiated with an output power of 5 W to 10 W. The operator proceeds with an operation of irradiating a therapeutic light to the same region a plurality of times while moving the light irradiator over the corresponding treatment target area. Due to this operation, the infundibulum of the sebaceous follicle, in which acne is in relatively less severe progress, may be necrotized. In addition, for adjacent normal skin tissues to which the therapeutic light is irradiated through this operation, there is an effect of aesthetic improvement as energy is absorbed into the skin tissues without damaging the stratum corneum.

When the first therapeutic light irradiating operation S21 ends, the operator may proceed with the second therapeutic light irradiating operation S22 of additionally irradiating a light to some regions of interest where the acne lesions have progressed to a severe level. For example, in this operation, treatment may be performed by irradiating a therapeutic light in the second treatment mode described above. Some regions of interest described above may correspond to a partial area in the entire treatment target area, the partial area which is determined to be a region of interest by the operator prior to the treatment. Such regions of interest may be an area in which acne lesions have progressed to Stages 3 and 4 are intensively distributed. The second therapeutic light irradiating operation may be performed in a manner of additionally irradiating a therapeutic light having the same parameters as those of the first therapeutic light irradiating operation. However, in this embodiment, the therapeutic light may be irradiated by adjusting the parameters to be suitable for treatment of acne lesions in Stages 3 and 4.

Specifically, in order to cope with a relatively greatly deformed infundibulum and inflammatory tissues, the therapeutic light used in the second therapeutic light irradiating operation may have a wider spot size and a higher output power, compared to the therapeutic light used in the first therapeutic light irradiating operation. For example, the controller may control the therapeutic light in this operation to have a spot size of about 300 µm to 500 µm and to be irradiated with an output power of 15 W to 25 W.

However, in the present embodiment, an example of primarily treating the entire treatment target area and then additionally treating a severe part of the area is disclose, but aspects of the present disclosure are not limited thereto, and it is also possible to divide the area by severity of lesion and perform treatment on each sub-area with a treatment light having different parameters. In addition, in this embodiment, the therapeutic light irradiation is performed in two operations, but aspects of the present disclosure are not limited thereto, and it is possible to perform therapeutic light irradiation in three or more operations by further subdividing the severity of a lesion.

Figure 9:
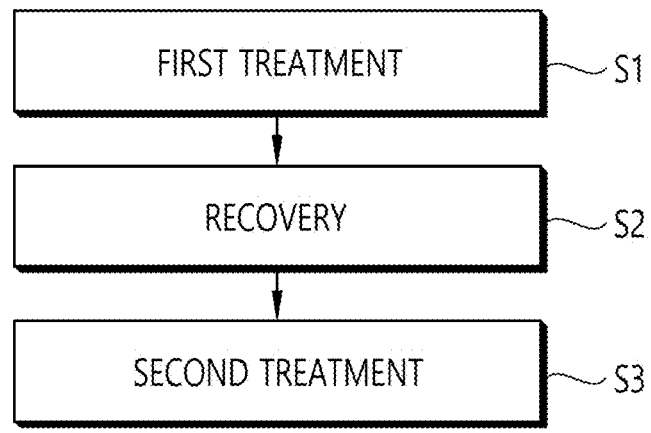
FIG. 9 is a flowchart illustrating a treatment method according to an embodiment of the present disclosure.

Meanwhile, such a method for treating acne may be performed once, but may also be performed multiple times with a certain recovery time. FIG. 9 is a flowchart illustrating a treatment method according to an embodiment of the present disclosure.

A first treatment S1 may be performed in the manner described above with reference to FIGS. 7 and 8. In the first treatment, the infundibulum of a sebaceous follicle where acne has occurred may be necrotized due to energy delivered by a therapeutic light.

The necrotic infundibulum may be remodeled through a recovery time in operation S2. The remodeling of the infundibulum may proceed sequentially, starting from the epidermis, and may take about 2 to 4 weeks.

When the recovery time passes, a second treatment may be performed in S3, and the second treatment may proceed in the same manner as the first treatment. As such, when the treatment is performed multiple times with a recovery time, it is found that the treatment of an acne lesion is much more effective. It may be because there is a sebaceous follicle left untreated when treatment is performed just once, and also because a severely deformed infundibulum is restored into a normal structure through multiple procedures of necrosis and remodeling.

However, in the case of FIG. 9, an example of two treatment operations is illustrated. However, aspects of the present disclosure are not limited thereto, and three or more treatment operations may be performed with a recovery time between every two of the treatment operations.

As such, in the method for treating acne according to the present disclosure, a therapeutic light irradiated to a treatment site may penetrate from the skin surface to an area underneath an acne lesion, and then absorbed by a sebaceous follicle and tissues adjacent to the sebaceous follicle. As a result, in the area of the acne lesion, when a part of the comedonal surface is removed, a drainage pathway may be formed, bacteria may be killed in an inflammatory site, and the spread of inflammation may be prevented. In addition, by inducing necrosis of the infundibulum of the sebaceous follicle and reducing the activity of the sebaceous gland, it is possible to restrict additional sebum secretion, thereby enabling effective treatment of acne. That is, according to the present disclosure, it is possible to collectively treat inflammatory acne and non-inflammatory acne, regardless of the progression of an acne lesion.

Furthermore, as the necrotic infundibulum is remodeled over a recovery time of several weeks, the infundibulum may be restored from a previous deformed and damaged structure to a normal structure. Therefore, since the sebaceous follicle with acne treated is restored to a normal hair follicle structure, it is possible to semi-permanently treat an acne lesion at a corresponding location or delay a recurrence cycle.

In addition, a therapeutic light used in this treatment method has a very high water absorption, so even when the therapeutic light is irradiated to normal skin tissues adjacent to a sebaceous follicle, energy may be delivered to underlying skin tissues without damaging the stratum corneum, and thus, there is an advantage of achieving aesthetic improvement of normal tissues as well as acne treatment.

In the above, one embodiment of the present disclosure has been described in detail, but aspects of the present disclosure are not limited to the above embodiment. It will be understood by those of ordinary skill in the art that various modifications and changes may be made therein through inclusion, alteration, removal or addition of elements without departing from the spirit and scope of the present disclosure as defined by the following claims.

What is claimed is:

1. A method for treating acne using a laser, the method comprising:
   positioning a light irradiator on a skin surface where the acne is located; and
   irradiating a therapeutic light through the light irradiator to denature some tissues beneath the acne,
   wherein the irradiating of the therapeutic light comprises:
   a first therapeutic light irradiating operation of irradiating the therapeutic light to the entire skin surface where the acne is located; and
   a second therapeutic light irradiating operation of selectively and additionally irradiating the therapeutic light to a partial area where relatively severe acne is located.

2. The method of claim 1, wherein in the irradiating of the therapeutic light, the therapeutic light is irradiated so that at least a part of an infundibulum beneath the acne is necrotized.

3. The method of claim 1, wherein the therapeutic light is irradiated so that energy is delivered to a duct opening of a sebaceous gland beneath the acne.

4. The method of claim 1, wherein a depth to which the therapeutic light penetrates ranges from 200 μm to 500 μm from the skin surface.

5. The method of claim 1, wherein the therapeutic light has a wavelength having a water absorption of 100 cm$^{-1}$ or more.

6. The method of claim 1, wherein the therapeutic light has a wavelength of 1800 nm to 2000 nm.

7. The method of claim 1, wherein the therapeutic light has a spot size of 150 μm to 500 μm and is irradiated with an output power of 5 W to 30 W.

8. The method of claim 7, wherein the therapeutic light has the spot size of 300 μm to 400 μm and is irradiated with the output power of 10 W to 25 W.

9. The method of claim 1, wherein in the second therapeutic light irradiating operation, the therapeutic light is irradiated to deliver more energy per unit area, compared to the first therapeutic light irradiating operation.

10. The method of claim 1, wherein in the second therapeutic light irradiating operation, the therapeutic light is irradiated at a higher irradiation density, compared to the first therapeutic light irradiating operation.

11. The method of claim 1, wherein in the second therapeutic light irradiating operation, the therapeutic light is irradiated with a larger spot size, compared to the first therapeutic light irradiating operation.

12. The method of claim 1, wherein in the second therapeutic light irradiating operation, the therapeutic light is irradiated with a greater output power, compared to the first therapeutic light irradiating operation.

13. A method for treating acne, comprising irradiating a therapeutic light to a skin surface where the acne is located to induce necrosis of an infundibulum beneath the acne, wherein the irradiating of the therapeutic light comprises:

a first therapeutic light irradiating operation of irradiating the therapeutic light to the entire skin surface where the acne is located; and a second therapeutic light irradiating operation of selectively and additionally irradiating the therapeutic light to a partial area where relatively severe acne is located.

14. The method of claim 13, further comprising:

after an elapse of a recovery time for remodeling the necrotic infundibulum, irradiating the therapeutic light to the remodeled infundibulum to induce re-necrosis of the infundibulum.

15. A laser treatment device for treating acne, the device comprising:

a light generator configured to generate a therapeutic light; and a light irradiator configured to irradiate the therapeutic light generated by the light generator to a skin surface, where the acne is located, so as to induce necrosis of an infundibulum beneath the acne, wherein the light irradiator is configured to irradiate the therapeutic light by performing a first therapeutic light irradiating operation of irradiating the therapeutic light to the entire skin surface where the acne is located, and a second therapeutic light irradiating operation of selectively and additionally irradiating the therapeutic light to a partial area where relatively severe acne is located.

16. The device of claim 15, wherein the therapeutic light is irradiated to deliver energy to a location 200 to 500 μm deep from the skin surface.

17. The device of claim 15, wherein the therapeutic light has a wavelength of 1800 nm to 2000 nm.

* * * * *